Sept. 17, 1935.  O. K. KJOLSETH  2,014,970
LATERAL RESTRAINT DEVICE
Filed June 28, 1934   2 Sheets-Sheet 2

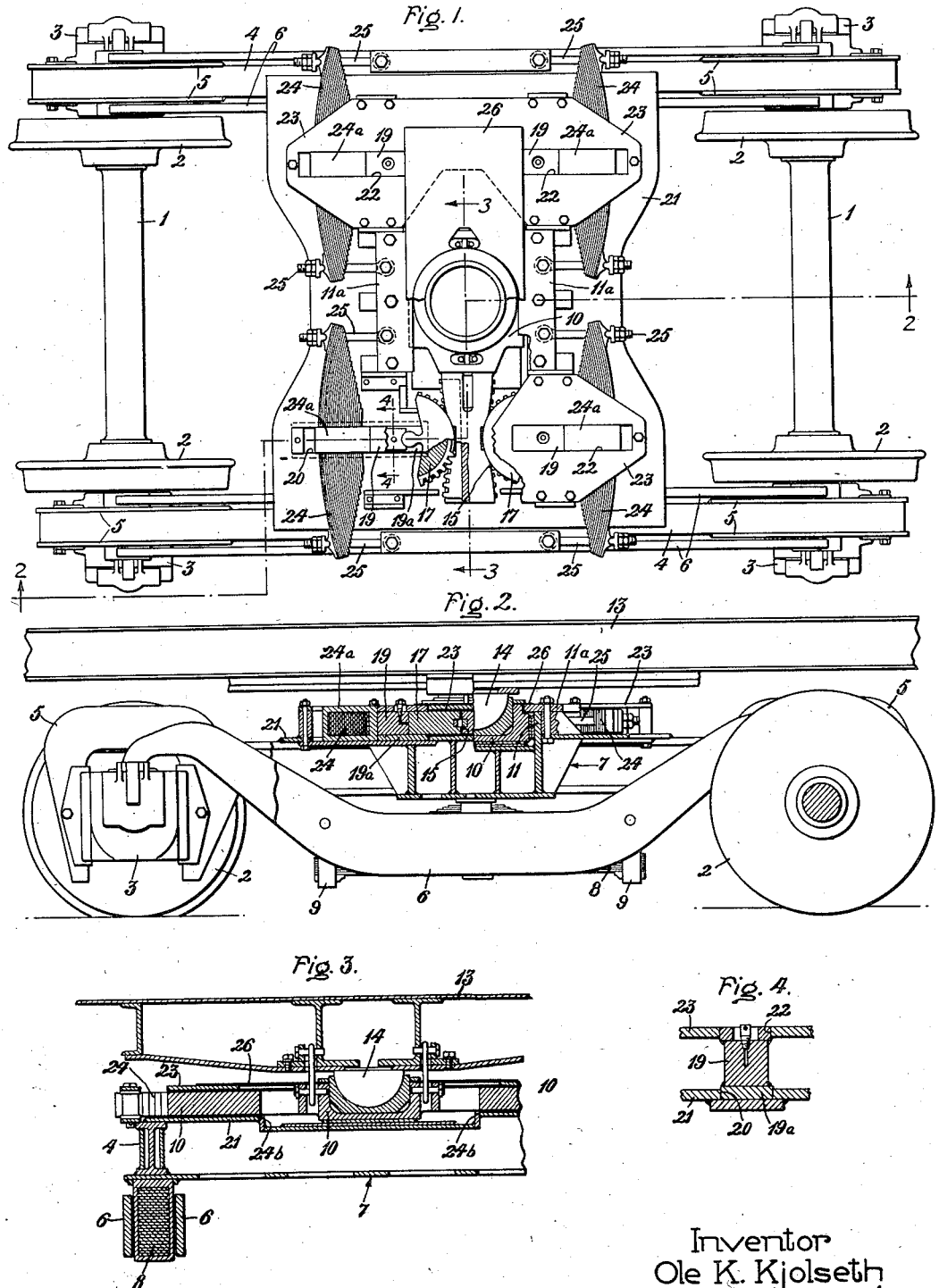

Inventor:
Ole K. Kjolseth,
by Harry E. Dunham
His Attorney.

Patented Sept. 17, 1935

2,014,970

UNITED STATES PATENT OFFICE 2,014,970

LATERAL RESTRAINT DEVICE

Ole K. Kjolseth, Erie, Pa., assignor to General Electric Company, a corporation of New York Application June 28, 1934, Serial No. 732,804

12 Claims. (Cl. 105—189)

My invention relates to lateral restraint devices for railway trucks for permitting restrained lateral movement between a truck and the frame of a railway vehicle supported thereby.

In railway vehicles, it is usual to support the vehicle frame on a plurality of trucks, and in order to lessen the pressure exerted by the flanges of the wheels against the rails when the vehicle is passing over uneven tracks or around a curve, it is necessary to provide some arrangement for permitting lateral movement of the vehicle frame relative to the supporting trucks. It is also desirable, particularly in the case of guiding trucks, that the lateral movement of the vehicle frame relative to the truck shall not affect the distribution of weight on the truck.

An object of my invention is to provide an improved lateral restraint device which will resiliently center the vehicle frame on a truck, and which will not affect the distribution of weight on the truck.

Further objects and advantages of my invention will become apparent as the following description proceeds and the features of novelty which characterize my invention will be pointed out with particularity in the claims annexed to and forming a part of this specification.

Figure 5:
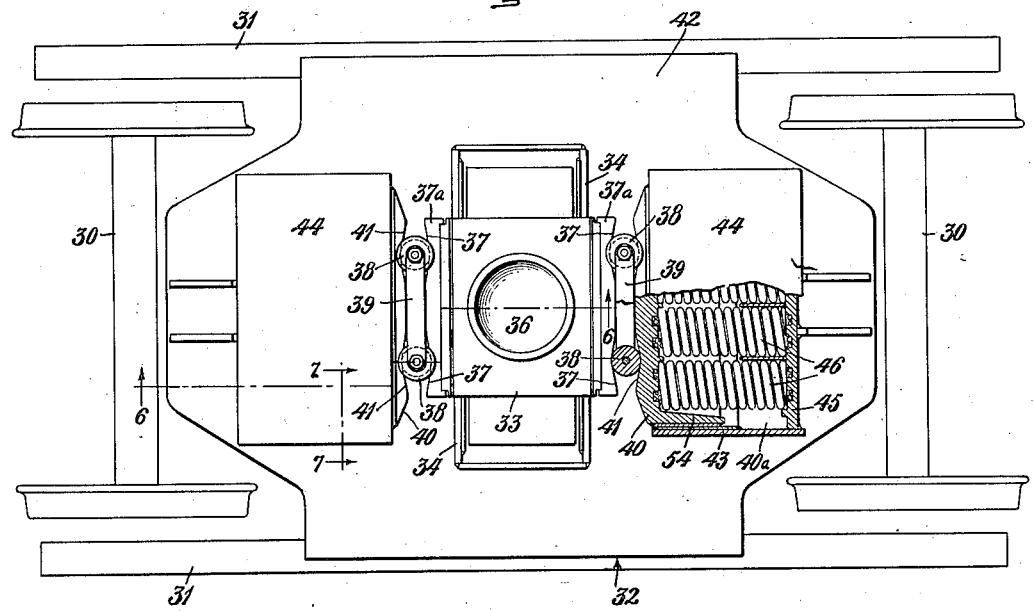
Figure 6:
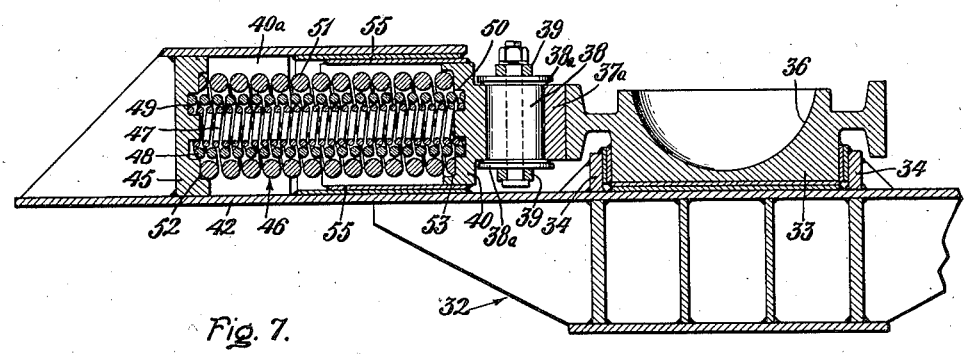

In the accompanying drawings, Fig. 1 is a plan view partially broken away of a truck having a lateral restraint device embodying my invention; Fig. 2 is a sectional view on line 2—2 of Fig. 1; Fig. 3 is a sectional view on line 3—3 of Fig. 1; Fig. 4 is a sectional view on line 4—4 of Fig. 1; Fig. 5 is a plan view of a truck including a modification of the lateral restraint device embodying my invention; Fig. 6 is a sectional view on line 6—6 of Fig. 5; and Fig. 7 is a sectional view on line 7—7 of Fig. 5.

Referring to the drawings, in Figs. 1 to 4 I have shown my invention in connection with a two-axle guiding truck having axles 1 provided with wheels 2 and journal boxes 3. The side frames 4 of the truck are provided with pedestal jaws 5 at either end which retain the journal boxes 3 and the axles 1 in a fixed horizontal position and allow vertical movement of the axles with respect to the truck frame. Weight is transmitted to the axles by parallel equalizer bars 6 arranged on either side of the pedestal jaws and bearing on the journal boxes. A bolster 7 integral with the side frames 4 and journal box pedestals 5 is supported on transverse springs 8 arranged between the equalizer bars 6 and connected thereto at either end by spring shackles 9. The bolster carries a center plate 10 which is slidable laterally of the bolster in guides 11 formed in the bolster. Plates 11a secured to the bolster and extending over the sides of the center plate prevent vertical displacement of the center plate. The weight of the vehicle frame 13 is carried on the center plate by a center pin 14.

In order to lessen the pressure exerted by the flanges of the wheels against the rails when the vehicle is rounding a curve or passing over uneven track, it is necessary to provide some arrangement for centering the vehicle frame on the truck and for permitting lateral movement of the frame with respect to the truck. In accordance with my invention I provide a resilient centering device including transverse springs 24 retained between vertically spaced plates 21 and 23 of the bolster on either side of the center plate for centering the vehicle frame 13 on the bolster. Each of the springs 24 is connected to the bolster at either end by rods 25, and is guided longitudinally of the bolster during deflection by a band 24a which surrounds the central part of the spring and fits within a recess or guide 20 formed in the lower plate 21, and an opening or guide 22 in the upper plate 23. The plates 21 and 23 prevent vertical displacement of the springs during deflection. In order to utilize the deflection of the springs 24 to center resiliently the center plate, I provide a block or member 19 arranged in the recess 20 of the plate 21 and the opening 22 of the plate 23 which bears at one end on the shackle 24a and is pivotally connected at the other end to a segmental cam or rocker 17, as shown in Fig. 1. The rocker 17 has teeth on its inner surface which engage complementary teeth in the oppositely inclined surface 15 of a block attached to the center plate. Lateral movement of the center plate with respect to the bolster causes the block 19 to be moved longitudinally of the bolster against the force exerted by the transverse springs 24. The stop 24b on the bolster limits the lateral movement of the center plate. The plate 23 extends over the segmental cams 17 and prevents vertical displacement of the cams during lateral movement of the center plate. A plate 26 extends over the center plate and acts as a dust guard. Vertical displacement of the blocks 19 is prevented by the extension 19a on the lower side of each of the blocks 19 which fits under the cooperating cam 17. The parts of the resilient centering mechanism are thus conveniently arranged and guided in the bolster, and since the lateral movement of the center plate is in the plane of the bolster, the weight carried on the truck center plate is unaffected by lateral movement of the center plate.

Figure 7:
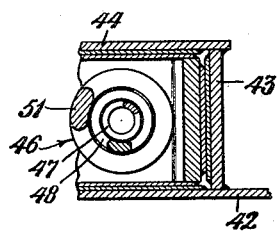

In Figs. 5, 6, and 7, I have illustrated a modification of the lateral motion device embodying my invention applied to a two-axle guiding truck. The axles of the truck are indicated at 30, and the side frames of the truck carried by the wheels and axles are indicated at 31. A bolster 32 is placed above the side frames 31 of the truck and suitably supported thereon. A center plate 33 is carried on the bolster between guides 34 which allow lateral movement of the center plate with respect to the bolster. The vehicle frame is supported by a center pin fitting into the semispherical seat 36 in the center plate.

The center plate 33 is resiliently centered on the bolster 32 by nests of coil springs 46 arranged on opposite sides of the center plate and retained under compression within a spring pocket 40*a* between a stop 45 and a sliding block or member 40. The spring pocket 40*a* is formed integral with the bolster between plate 42 of the bolster, vertical side plates 43 welded at their lower ends to the plate 42, a horizontal plate 44 vertically spaced from plate 42 and welded to the upper ends of side plates 43, and the stop 45 is secured to the plates 42, 43, and 44 at the end of the pocket 40*a* opposite the center plate. Each nest of springs comprises concentric coil springs 47 and 48, the respective ends of which fit within a recess 49 in the stop 45 and a recess 50 in the sliding block 40, and an outer concentric coil spring 51, the respective ends of which are arranged in a recess 52 in the stop 45 and a recess 53 in the sliding block 40. The block 40 is channel shaped having flanges 54 slidably engaging the side plates 43 and horizontal plates 55 secured to the top and bottom of each flange to provide an enclosure for one end of the springs.

In order to utilize the nests of springs 46 to center resiliently the center plate on the bolster, I provide rolls 38 at opposite sides of the center plate and arranged between the center plate and the block 40, and engaging oppositely inclined surfaces 37 on a plate 37*a* secured to the center plate and oppositely inclined surface 41 on the block 40. The rolls are maintained in the proper relative position during the lateral movement of the center plate by connecting links 39 arranged above and below the rolls 38 and pivotally connected thereto. Flanges 38*a* on the rolls project over the inclined surfaces 37 and 41 and prevent vertical displacement of the rolls. With this arrangement, lateral movement of the center plate with respect to the bolster causes the block 40 to be moved longitudinally of the bolster against the force exerted by the springs 46, and the force exerted by these springs tends to center the center plate resiliently on the bolster. The longitudinal movement of the block 40 is guided by the pocket 40*a*. The lateral movement of the center plate with respect to the bolster is in the plane of the bolster, and this movement does not elevate the vehicle frame supported by the center plate and thereby produce uneven distribution of weight on the trucks of the vehicle.

Although I have shown particular embodiments of my invention, I do not desire to be limited to the constructions described, and I intend in the appended claims to cover all modifications which do not depart from the spirit and scope of my invention.

What I claim as new and desire to secure by Letters Patent of the United States, is:

1. A truck for a locomotive or car comprising a bolster having a guide extending longitudinally of the truck, a center plate carried by said bolster and movable laterally of the truck, a member movable longitudinally in said guide, means including a spring on said bolster for resisting longitudinal movement of said member, and means including said member for centering said center plate on said bolster.

2. A truck for a locomotive or car comprising a bolster having a guide extending longitudinally of the truck, a center plate carried by said bolster and movable laterally of the truck, a member movable longitudinally in said guide, means including a spring on said bolster for resisting longitudinal movement of said member, and means engaging said center plate and said member for centering said center plate on said bolster.

3. A truck for a locomotive or car comprising a bolster having a guide extending longitudinally of the truck, a center plate carried by said bolster and movable laterally of the truck, a member movable longitudinally in said guide, a spring carried by said bolster for resisting longitudinal movement of said member, means including a plate extending over said spring for preventing vertical displacement of said spring, and means including said member for centering said center plate on said bolster.

4. A truck for a locomotive or car comprising a bolster, a center plate carried by said bolster, and movable laterally of said truck, a member movable longitudinally of said bolster, means including a spring for resisting longitudinal movement of said member, means including a guide in said bolster and extending longitudinally of the truck for guiding said member and for preventing vertical displacement of said spring, and means including said member for centering said center plate on said bolster.

5. A truck for a locomotive or car comprising a bolster, a center plate carried by said bolster and movable laterally of the truck, a member movable longitudinally of said truck, means including a pocket formed integral with said bolster for guiding the longitudinal movement of said member, means including a spring extending within said pocket for resisting longitudinal movement of said member, and means including said member for centering said center plate on said bolster.

6. A truck for a locomotive or car comprising a bolster, a center plate carried by said bolster and movable longitudinally of said truck, a member movable longitudinally of said truck, means including a pocket formed integral with said bolster for guiding the longitudinal movement of said member, means including a spring extending within said pocket for resisting longitudinal movement of said member, and means engaging said member for centering said center plate on said bolster.

7. A truck for a locomotive or car comprising a bolster, a center plate carried by said bolster and movable laterally of said truck, a pocket on said bolster having a stop at one end, a member slidable longitudinally of said truck in said pocket, a spring within said pocket bearing against said stop and said member, and means including said member for centering said center plate on said bolster.

8. A truck for a locomotive or car comprising a bolster, a center plate carried by said bolster and movable laterally of said truck, a pocket on said bolster having a stop at one end, a member slidable longitudinally of said truck in said pocket, a spring within said pocket bearing against said stop and said member, and means engaging said member for centering said center plate on said bolster.

9. A truck having a locomotive or car comprising a bolster having vertically-spaced plates, a center plate carried by said bolster and movable laterally of said truck, a member slidable longitudinally of said truck between said plates and guided thereby, a spring retained between said plates for resisting longitudinal movement of said member, and means including said member for centering said center plate on said bolster.

10. A truck for a locomotive or car comprising a bolster having vertically-spaced plates, a center plate having an inclined surface thereon carried by said bolster and movable laterally of said truck, a member slidable longitudinally of said truck between said plates and guided thereby, a spring retained between said plates for resisting longitudinal movement of said member, and means engaging said member and said inclined surface for centering said center plate on said bolster.

11. A truck having a locomotive or car comprising a bolster having vertically-spaced plates with guides extending longitudinally of said truck therein, a center plate carried by said bolster and movable laterally of said truck, a member slidable longitudinally of said truck between said plates and in said guides, a transverse spring retained between said plates having a band extending in said guides for resisting longitudinal movement of said member, and means including said member for centering said center plate on said bolster.

12. A truck for a locomotive or car comprising a bolster, a center plate carried by said bolster and movable laterally of said truck, a stop on said bolster having a recess therein facing said center plate, a member slidable longitudinally of said truck, means on said bolster for guiding the longitudinal movement of said member, a coil spring having one end held within said recess and the other end bearing against said center plate, and means including said member for centering said center plate on said bolster.

OLE K. KJOLSETH.